Dec. 30, 1947. J. J. COOK 2,433,435
ANTISKID DEVICE
Filed Oct. 19, 1946 2 Sheets-Sheet 1

INVENTOR.
John J. Cook
BY
Hauke & Hardesty.
ATTORNEYS

Dec. 30, 1947.   J. J. COOK   2,433,435
ANTISKID DEVICE
Filed Oct. 19, 1946   2 Sheets-Sheet 2
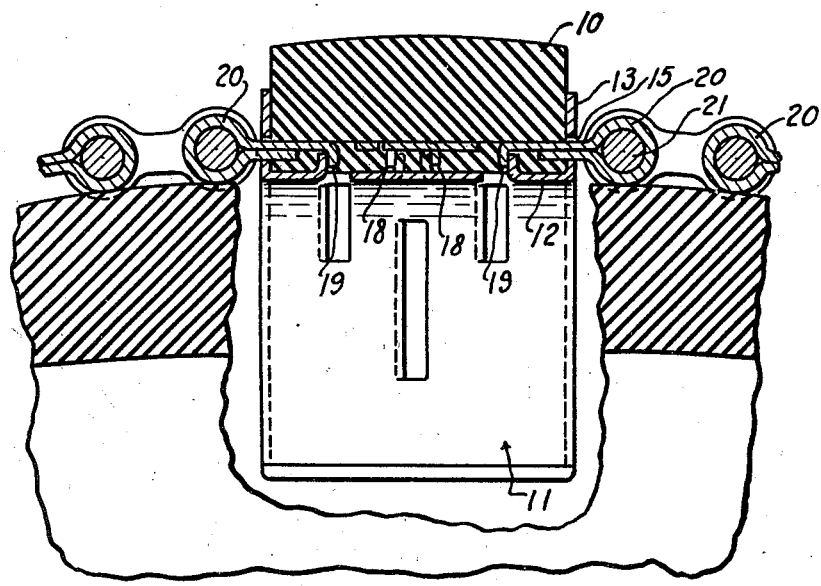
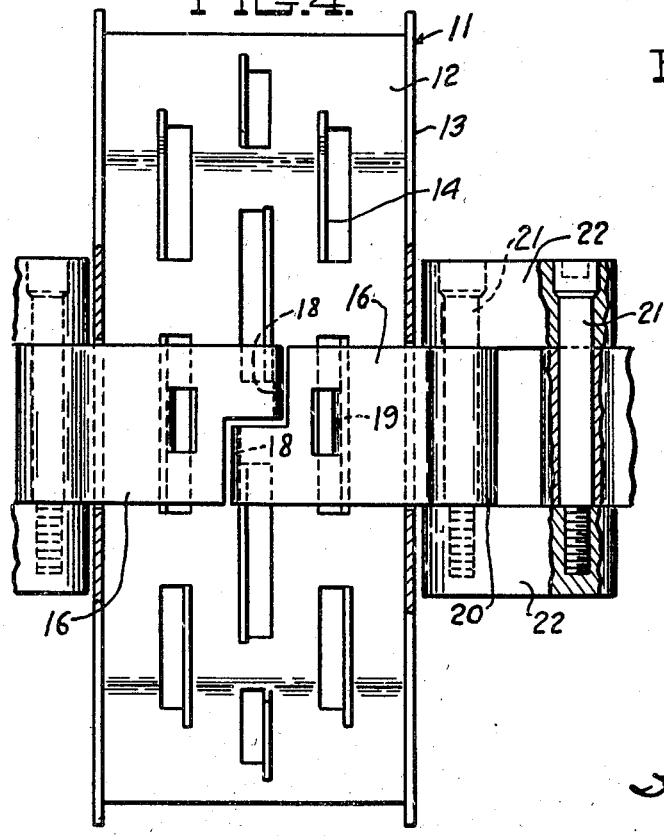
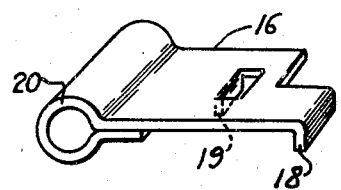
INVENTOR.
John J. Cook
BY
Hauke & Hardesty
ATTORNEYS Patented Dec. 30, 1947

2,433,435

UNITED STATES PATENT OFFICE 2,433,435

ANTISKID DEVICE

John J. Cook, Detroit, Mich., assignor to John J. Cook Manufacturing Corporation, Detroit, Mich., a corporation of Michigan Application October 19, 1946, Serial No. 704,411

9 Claims. (Cl. 152—225)

1

This invention relates to an anti-skid device for rubber tired vehicles, used generally to extricate these vehicles from mud, deep snow and to prevent skidding upon ice covered surfaces.

An object of the present invention is to provide an improved anti-skid device which employs a plurality of annularly spaced resilient rubber blocks, all of which are hinged together by a continuous flexing annular metal rim assembly, which carries said rubber blocks or sections, any of such sections being readily removable when worn to such an extent as to be unserviceable, in order to facilitate maintenance of this equipment.

A further object of the present invention is to provide a device of this type whereby manufacturing and maintenance costs are maintained at a minimum by constructing an improved interlocking assembly of the continuous metallic hinged members which extend about the tire periphery.

Interchangeable intermediate metal plates are further provided to facilitate manufacture of such devices in volume production, said plates being readily assembled to the metal channel to which is molded the rubber anti-skid blocks, said members being readily detachably hinged to similar members carried by adjacent sections, whereby to facilitate maintenance and repair as well as to provide for an initial economical first cost.

Figure 1:
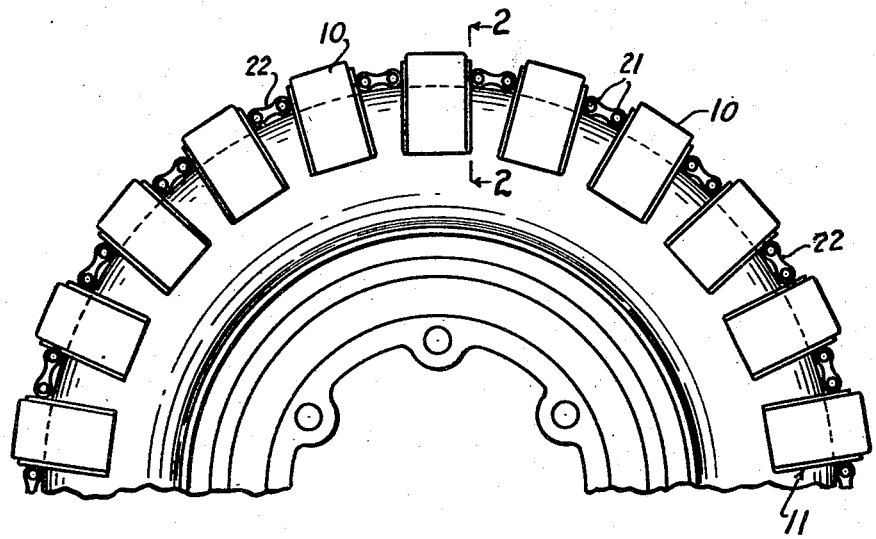
Figure 2:
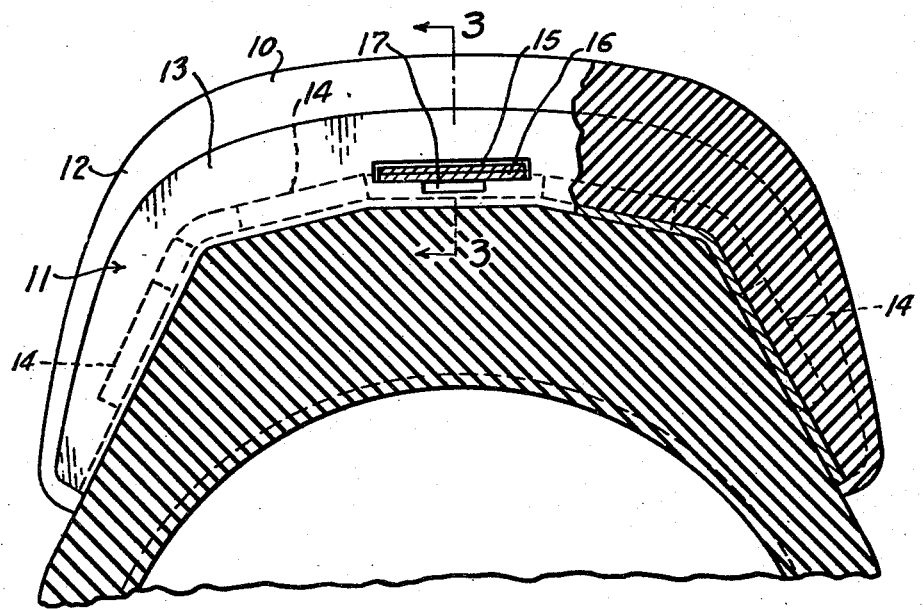

For a more detailed understanding of the invention, reference may be had to the accompanying drawings illustrating a preferred embodiment of the invention, like characters referring to like parts throughout the several views, and in which:

Fig. 1 is a fragmentary side elevation of a rubber tired vehicle wheel showing the anti-skid device secured thereon, Fig. 2 is an enlarged transverse sectional view taken substantially on the line 2—2 of Fig. 1, Fig. 3 is an enlarged fragmentary longitudinal sectional view thereof, taken substantially on the line 3—3 of Fig. 2, Fig. 4 is a plan view of the metal U-shaped channel and the hinge plates assembled to said channel before molding of the rubber block therewith, and further showing how said plates are interlocked with said U-shaped metal channel, and Fig. 5 is a perspective view of one of said metal plates.

This anti-skid device comprises a plurality of rubber blocks circumferentially spaced around the periphery of the vehicle tire, all of which are hinged together to provide a continuous chain. The rubber blocks or sections 10 are substantially U-shaped and are supported in a U-shaped channel 11, which is constructed to straddle the tire tread, as more clearly illustrated in Figs. 1 and 2. The inside bottom base 12 of said channel rests snugly against the surface of tire, and rubber block 10 is molded into said channel and confined between the side flanges 13 of said channel 11.

The base 12 is provided with a plurality of punch out lugs or projections 14 extending vertically into said channel to key the molded rubber block thereto. Preferably, these lugs or projections are constructed in staggered relation as shown in Fig. 4, and substantially three parallel rows of said lugs or projections are formed from said channel. The sides 13 of the channel carry T-slots 15 through which the metal plates 16 project, these plates being supported along the bottom edge of said slots (see Fig. 3), the offset part of said slot, designated 17, providing clearance permitting said plates to be assembled to the channel, said clearance being necessitated by reason of the downturned lips 18 and 19 carried by said plates. The lip 18 is offset to one side at the extreme inner end of the plate 16 and locks over one of the middle lugs or projections 14 of said channel, while the intermediate lip 19 locks over another lug or projection of said channel (see Figs. 3 and 4) thus locking said plates against being pulled out when once assembled. The lugs or projections not only key the rubber block but also support the plates in conjunction with said slots 15. The outer end of each of these plates 16 terminate in a hinge eyelet 20 and receive the bolts 21 carried by and secured to the links 22 (see Figs. 3 and 4). These plates are thus detachably hinged by means of the links 22 to similar plates of an adjacent rubber block unit assembly and all pull or strain peripherally of the tire is carried through this continuous hinged chain formed of the plates and links, each channel being interlocked to said plates. It will further be noted that these plates may be identical in construction and are so formed as to suitably fit together end to end as shown in Fig. 4.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:

1. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending separate plate members in said channel and having one end portion projecting beyond the side walls of said metal channel circumferentially of the tire periphery and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous interlocked metal chain about the periphery of said tire.

2. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel circumferentially of the tire periphery and terminating in a hinge eyelet, rubber blocks molded within said metal channel and enclosing that portion of the plate members lying within the channel, said channel provided with abutments extending into said rubber blocks, said plate members having ears which engage with said abutments to interlock said plate members with said metal channel, and means for hinging said members to similar members of an adjacent U-shaped section to provide a continuous interlocked metal chain about the periphery of said tire.

3. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous interlocked metal chain about the periphery of said tire, said metal channel provided with a plurality of projections punched out of the base of said channel and extended inwardly of the channel and interlocked with the rubber block molded within said channel.

4. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous interlocked metal chain about the periphery of said tire, said metal channel provided with a plurality of staggered projections punched out of the base of said channel and extended inwardly of the channel and interlocked with the rubber block molded within said channel.

5. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous interlocked metal chain about the periphery of said tire, said metal channel provided with a plurality of projections punched out of the base of said channel and extended inwardly of the channel and interlocked with the rubber block molded within said channel, said metal plates having downturned lips engaging said channel projections to lock said plates with said channel.

6. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosig that portion of the plate members lying within the channel, means for interlocking said plate members with said metal channel, and means for hinging said members to similar members of an adjacent U-shaped section to provide a continuous interlocked metal chain about the periphery of said tire, said metal channel having a slot in each side wall through which said metal plates project and which support said plates in spaced relation with respect to the base of said metal channel.

7. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous interlocked metal chain about the periphery of said tire, said metal channel provided with a plurality of projections punched out of the base of said channel and extended inwardly of the channel and interlocked with the rubber block molded within said channel, said oppositely extending metal plates being identical in construction and each having a downturned lip at the extreme inner end thereof offset laterally to one side and engaging a projection on said channel to interlock the plates with said channel.

8. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous inter-locked metal chain about the periphery of said tire, said metal channel provided with a plurality of projections punched out of the base of said channel and extended inwardly of the channel and interlocked with the rubber block molded within said channel, said oppositely extending metal plates being identical in construction and each having a downturned lip at the extreme inner end thereof offset laterally to one side and engaging a projection on said channel to interlock the plates with said channel, said plates each having an intermediate downturned lip engaging another projection on said channel and interlocked therewith.

9. An anti-skid device consisting of a plurality of interlinked generally U-shaped sections adapted for assembly about a tire periphery, each of said sections comprising a metal channel extending transversely of the tire and constructed to substantially conform to the transverse contour of said tire, oppositely extending plate members in said channel and having one end portion projecting beyond the side walls of said metal channel and terminating in a hinge eyelet, rubber blocks molded within said metal channel and enclosing that portion of the plate members lying within the channel, means for interlocking said plate members with said metal channel, and means for hinging said members to similar members of an adjacent U-shaped section to provide a continuous inter-locked metal chain about the periphery of said tire, said metal channel provided with a plurality of projections punched out of the base of said channel and extended inwardly of the channel and inter-locked with the rubber block molded within said channel, said oppositely extending metal plates being identical in construction and each having a downturned lip at the extreme inner end thereof offset laterally to one side and engaging a projection on said channel to interlock the plates with said channel, said plates each having an intermediate downturned lip engaging another projection on said channel and interlocked therewith, said metal channel having a T-shaped slot in each side wall through which said metal plates project and which support said plates in spaced relation with respect to the base of said metal channel, the leg of said T-slot providing clearance for the downturned lips carried by said plates on assembly of said plates with said channel, said slots having a width substantially the same as the width of the plates, the width of said downturned lips being less than the width of the plates and substantially the same as the width of the leg of said T-slot.

JOHN J. COOK.

REFERENCES CITED

The following references are of record in the file of this patent:

UNITED STATES PATENTS

| Number | Name | Date |
|---|---|---|
| 1,523,135 | Martin | Jan. 13, 1925 |
| 2,198,906 | Conway | Apr. 30, 1940 |

FOREIGN PATENTS

| Number | Country | Date |
|---|---|---|
| 121,021 | Great Britain | Dec. 5, 1918 |